US010326349B2

(12) United States Patent
Ricciuti et al.

(10) Patent No.: US 10,326,349 B2
(45) Date of Patent: Jun. 18, 2019

(54) MAGNETIC LINEAR ACTUATOR

(71) Applicant: EATON CORPORATION, Cleveland, OH (US)

(72) Inventors: Anthony T. Ricciuti, Bethel Park, PA (US); Mark A. Juds, New Berlin, WI (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 92 days.

(21) Appl. No.: 15/798,512

(22) Filed: Oct. 31, 2017

(65) Prior Publication Data

US 2019/0131861 A1    May 2, 2019

(51) Int. Cl.
*H02K 41/02* (2006.01)
*H02K 41/03* (2006.01)

(52) U.S. Cl.
CPC .................................. *H02K 41/033* (2013.01)

(58) Field of Classification Search
CPC ........ H02K 33/16; H02K 33/18; H02K 33/02; H02K 33/00; H02K 41/033; H02K 7/1876
USPC .............................. 310/12.25, 15, 20–21, 37
See application file for complete search history.

(56) References Cited

U.S. PATENT DOCUMENTS

| | | | | |
|---|---|---|---|---|
| 4,346,318 A * | 8/1982 | Shtrikman | ............. | H02K 33/06 310/12.24 |
| 4,358,691 A * | 11/1982 | Naylor | .................. | H01F 7/1615 310/12.04 |
| 8,177,523 B2 * | 5/2012 | Patel | ..................... | F04B 35/045 29/596 |
| 2005/0212365 A1* | 9/2005 | Kraus | ................... | B26B 19/282 310/36 |
| 2006/0110259 A1* | 5/2006 | Puff | ...................... | F04B 35/045 417/44.2 |

* cited by examiner

*Primary Examiner* — Thanh Lam
(74) *Attorney, Agent, or Firm* — Eckert Seamans

(57) ABSTRACT

A magnet linear actuator includes a first element and an armature situated on a support, with the armature being movable along a movement axis between a first position engaged with the first element and the second position spaced away from the first element along the movement axis. The actuator further includes a biasing element that biases the armature in a direction generally toward the second position. The first element or the armature is pivotable with respect to the other between a first orientation and a second orientation. In the first orientation, the first element and the armature have a first magnetic attraction to one another that is sufficient to overcome the bias of the biasing element and to retain the armature in the first position. In the second orientation, the first element and the armature have either a magnetic repulsion to one another or a weaker second magnetic attraction.

20 Claims, 10 Drawing Sheets

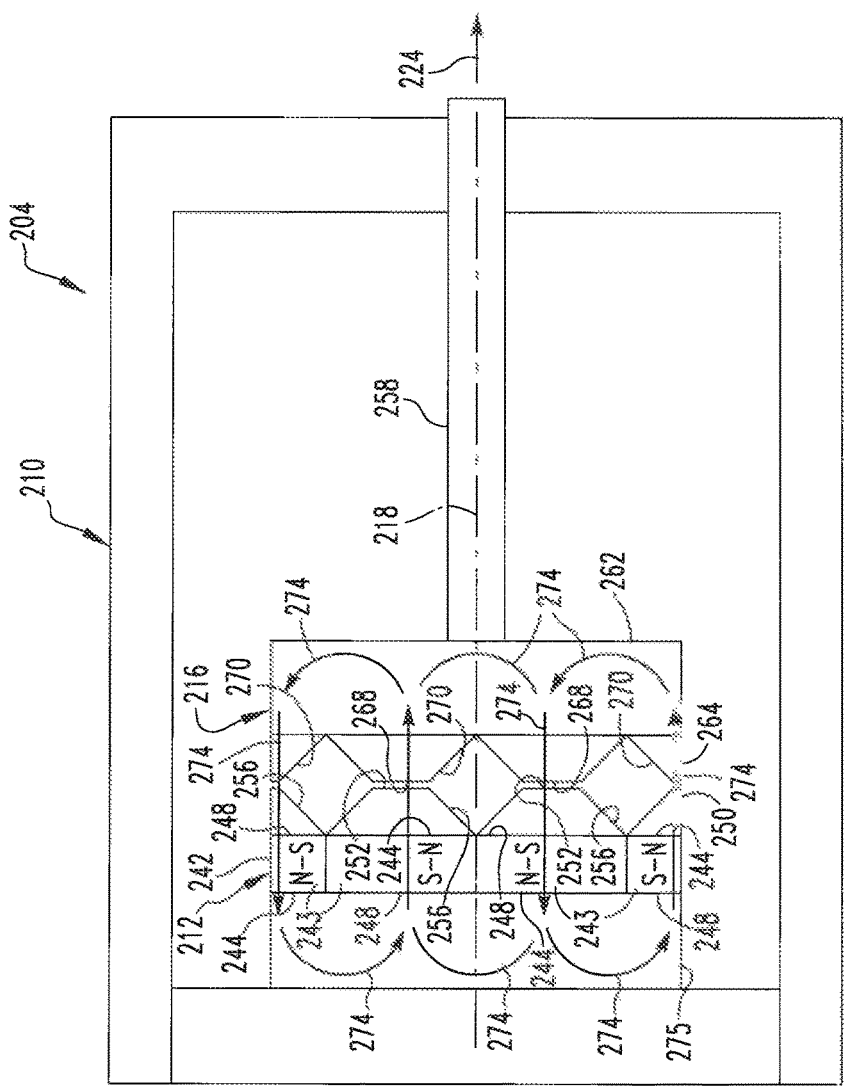
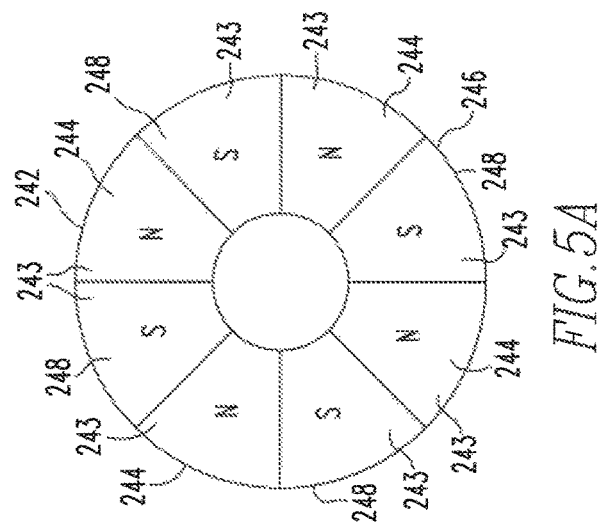
FIG. 5
FIG. 5A

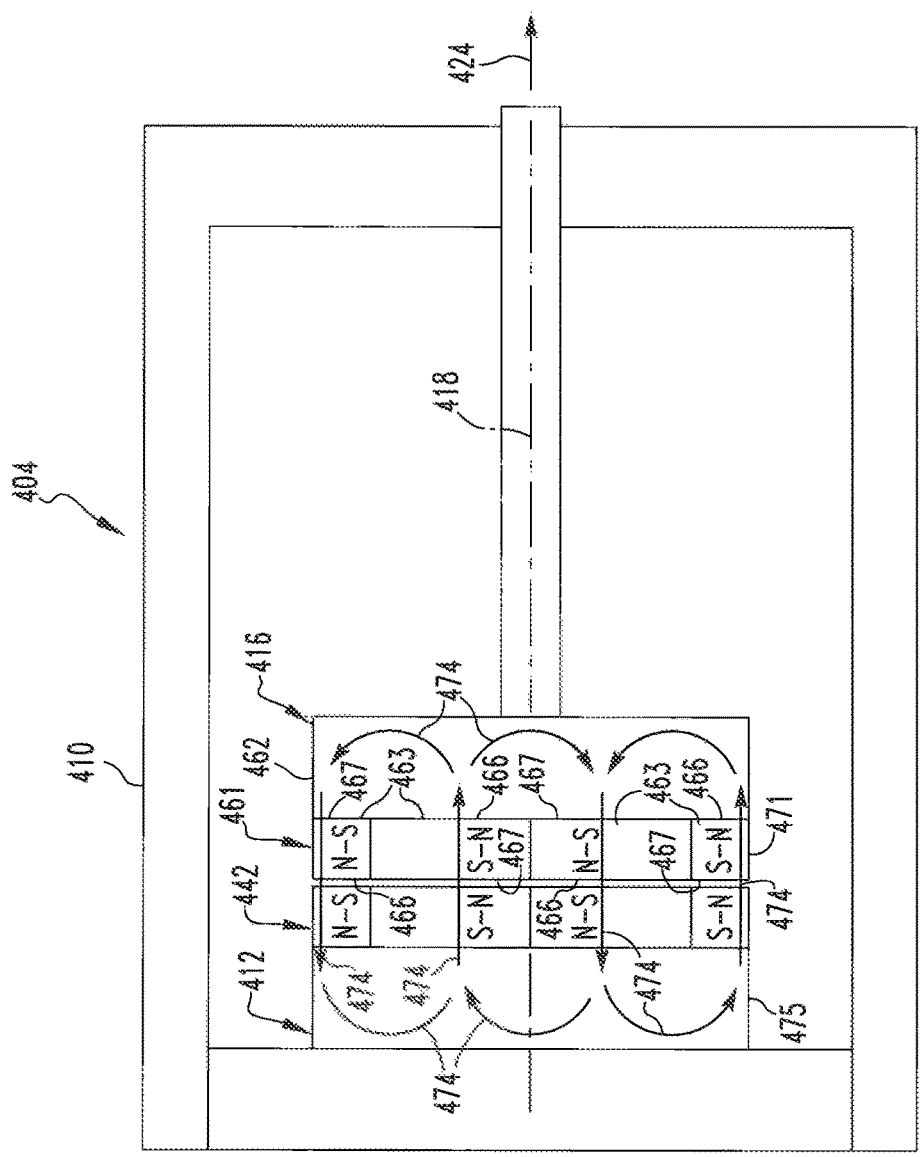
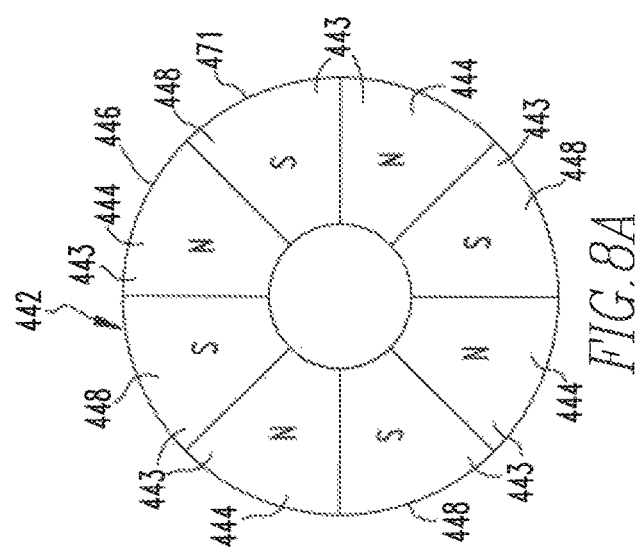
FIG. 8
FIG. 8A

MAGNETIC LINEAR ACTUATOR

BACKGROUND

Field

The disclosed and claimed concept relates generally to electronic devices and, more particularly, to a magnetic linear actuator.

Related Art

Electromagnetic actuators are devices commonly found in power equipment and provide working motion via of an internal electromagnetic field, with the motion of the actuator providing a control or switching function in such power equipment. Electromagnetic actuators provide the movement used for actuation by exposing a free moving plunger or armature to the magnetic field created by energizing a static wire coil. The field attracts the plunger or armature which resultantly moves with respect to the field, thus providing the required actuation. Varying degrees of actuation functionality can be achieved with an electromagnetic actuator, ranging from simple single-cycle, single-speed actions to fairly sophisticated control of both actuation time and positioning.

One type of commonly used electromagnetic actuator is a permanent magnet actuator, which makes use of one or more permanent magnets and electric energy to control positioning of a plunger therein. Permanent magnet actuators may be configured such that the plunger thereof is held at a stroke position due to the permanent magnet, with electricity being applied to the wire coil to move the plunger to a different stroke position.

In such permanent magnet actuators, the wire coil typically is employed to move the armature to a first position in proximity to the permanent magnet and to overcome the bias of a return spring that biases the armature in a direction generally away from the permanent magnet. When it is desired to move the armature away from the permanent magnet to move the armature to a second position spaced from the first position, the wire coil typically is energized with a reverse polarity so that its magnetic field counteracts that of the permanent magnet, which resultantly permits the bias of the return spring to overcome the partially counteracted magnet attraction of the permanent magnet. It is noted, however, that the energy that is used to power the wire coil in order to move the armature away from the permanent magnet is typically stored in large capacitors, and the charge necessary to energize the wire coil sometimes can be absent if the charge therein has been dissipated due to non-use of the actuator for an extended period of time. In such an event, significant forces are typically required to be applied to the armature in order to overcome the magnetic attraction of the permanent magnet. Such forces can be difficult to apply, and the need to apply them is undesirable in a situation where a rapid movement of the armature away from the permanent magnet is needed, such as in order to switch a circuit breaker from an ON position to an OFF position in a hurry. Improvements thus would be desirable.

SUMMARY

An improved magnet linear actuator includes a first element and an armature situated on a support, with the armature being movable along a movement axis between a first position engaged with the first element and the second position spaced away from the first element along the movement axis. The actuator further includes a biasing element that biases the armature in a direction generally toward the second position. One of the first element and the armature is pivotable with respect to the other between a first orientation and a second orientation. In the first orientation, the first element and the armature have a first magnetic attraction to one another that is sufficient to overcome the bias of the biasing element and to retain the armature in the first position. In the second orientation, the first element and the armature have either a magnetic repulsion to one another or a second magnetic attraction to one another that is weaker than the first magnetic attraction that is overcome by the bias of the biasing element. The armature is thus caused to move to the second position upon movement from the first orientation to the second orientation.

In one embodiment, the first element includes a permanent magnet, and the first element and the armature both include plates having elevated portions and recessed portions that alternate with one another along a circular perimeter of the plates. In the first orientation, the elevated portions of one plate are in a confronting relationship with the elevated portions of the other plate, which thereby result in a large magnetic flux from the permanent magnet through the armature and which results in a first magnetic attraction. When one of the plates is rotated with respect to the other from the first orientation to the second orientation, the elevated portions of one plate confront the recessed portions of the other plate and vice versa, thus resulting in a second magnetic attraction weaker than the first magnetic attraction and which is overcome by the bias of the biasing element to move the armature from the first position to the second position.

In another embodiment, first and second ferromagnetic plates having alternating elevated and recessed portions are provided on a first element that additionally includes a permanent magnet. The armature is separate from the plates. In the first orientation when elevated portions of one plate confront elevated portions of the other plate and recessed portions of one plate confront recessed portions of the other plate, magnetic flux through the armature results in a first magnetic attraction that retains the armature in the first position. When one of the plates is rotated from the first orientation to the second orientation with respect to the other plate, the elevated portions of one plate confront recessed portions of another plate and vice versa to result in lessened magnetic flux through the armature and a second magnetic attraction that is weaker than the first magnetic attraction to permit the biasing element to overcome the weaker magnetic attraction and to move the armature toward the second position.

In another embodiment, a first element includes a permanent magnet having a plurality of magnet elements positioned adjacent one another along a circular perimeter of the permanent magnet and whose poles that face generally toward the armature have alternating NORTH and SOUTH poles along the perimeter. The NORTH and SOUTH alternating poles of the magnet elements are aligned with alternating elevated and recessed portions on a ferromagnetic first plate that is situated adjacent the permanent magnet. The armature includes another ferromagnetic plate that likewise has alternating elevated and recessed portions. In the first orientation, the elevated portions of one plate confront the elevated portions of the other plate, and the recessed portions of both plates likewise are confronting to result in a first magnetic attraction due to magnetic flux from the magnet elements of the permanent magnet flowing through the two plates. When one of the plates is rotated from the first orientation to a second orientation, the elevated portions of one plate confront the recessed portions of the other plate and vice versa, thus resulting in a second magnetic attraction within the plates that is weaker than the first magnetic attraction, which thus is overcome by the bias of the biasing element to move the armature away from the first position and toward the second position.

In another embodiment, the first portion includes a first plate upon which are situated a number of magnetic elements and a number of ferromagnetic elements that are alternately positioned along a circular path. The armature likewise includes a base having magnetic elements and ferromagnetic elements that are alternately positioned along another circular path thereon. When the first plate and the base are in the first orientation, the magnetic elements of the first element are confronting with and are magnetically attracted with the ferromagnetic elements of the armature, and vice versa. When one of the first elements and the armature is pivoted from the first position to the second position, the magnetic elements of the first element are in a confronting relationship with the magnetic elements of the armature, and such confronting magnetic elements are of similar polarity, to thus result in a mutual magnetic repulsion between the first portion and the armature in the second orientation which results in movement of the armature toward the second position by operation of the biasing element connected therewith.

In another embodiment, the first element includes a permanent magnet having a plurality of magnet elements that are positioned along the circular path and whose poles that face generally toward the armature alternate between NORTH and SOUTH along the path. Likewise, the armature includes another permanent magnet having another set of magnet elements positioned along another circular path and whose poles that face generally toward the first element alternate between NORTH and SOUTH along the path. In the first orientation, the NORTH poles of the first element are in a confronting relationship with the SOUTH poles of the armature, and vice versa. When the armature is pivoted from the first orientation to the second orientation, the NORTH poles of the first element and the armature confront one another, and the SOUTH poles of the first element and the armature likewise confront one another to result in a mutual magnetic repulsion of the first element and the armature. This results in movement of the armature toward the second position and biasing by the biasing element of the armature to the second position.

Accordingly, an aspect of the disclosed and claimed concept is to provide an improved magnetic linear actuator which, in a first orientation, retains an armature in a first position engaged with a first portion and which, in a second orientation rotated from the first orientation, the armature is caused to move away from the first portion toward a second position along a movement axis.

As such, an aspect of the disclosed and claimed concept is to provide an improved magnetic linear actuator structured for use in a device. The magnetic linear actuator can be generally stated as including a support, a first element situated on the support, an armature that is movable with respect to the support along a movement axis between a first position engaged with the first element and a second position spaced away from the first element along the movement axis, a biasing element that biases the armature in a direction generally toward the second position, and at least a portion of one of the first element and the armature being pivotable with respect to the other of the first element and the armature between a first orientation and a second orientation, in the first orientation the first element and the armature having a first magnetic attraction to one another sufficient to overcome the bias of the biasing element and retaining the armature in the first position, in the second orientation the first element and the armature having one of a magnetic repulsion from one another and a second magnetic attraction to one another that is weaker than the first magnetic attraction and that is overcome by the bias of the biasing element to cause the biasing element to move the armature toward the second position.

BRIEF DESCRIPTION OF THE DRAWINGS

A further understanding of the disclosed and claimed concept can be gained from the following Description when read in conjunction with the accompanying drawings in which:

FIG. 1A is front elevational view of a permanent magnet of the actuator of FIG. 1;

FIG. 3A is a front elevational view of a permanent magnet of the actuator of FIG. 3;

FIG. 5 is a schematic side depiction of an improved actuator in accordance with a third embodiment of the disclosed and claimed concept in a first orientation and with an armature thereof in a first position;

FIG. 5A is a front elevational view of a permanent magnet of the actuator of FIG. 3;

FIG. 8 is a schematic side depiction of an improved actuator in accordance with a fifth embodiment of the disclosed and claimed concept in a first orientation and with an armature thereof in a first position;

FIG. 8A is a front elevational view of a permanent magnet of the actuator of FIG. 8;

Similar numerals refer to similar parts throughout the specification.

DESCRIPTION

Figure 1:
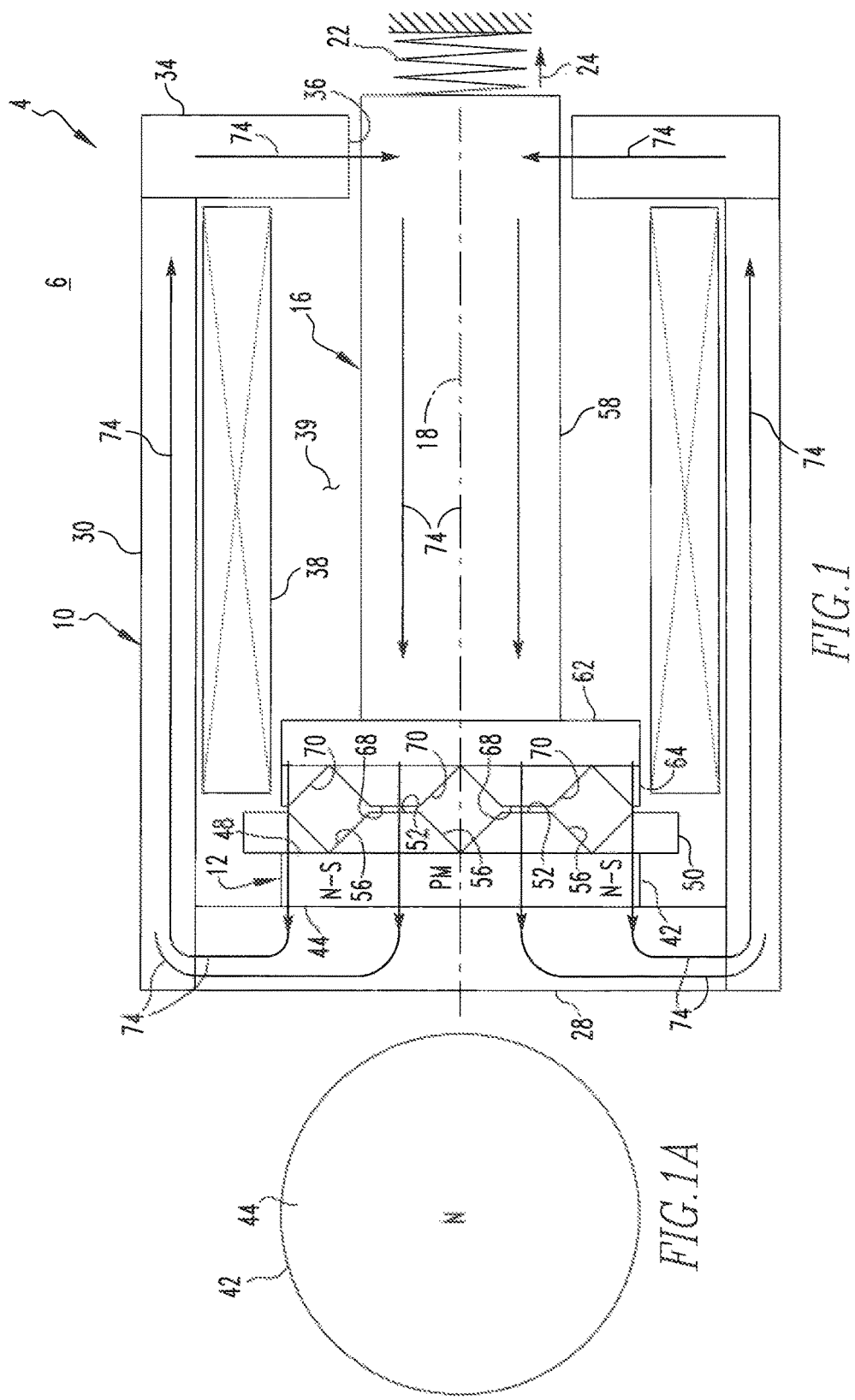
FIG. 1 is a side schematic view of a magnetic linear actuator in accordance with a first embodiment of the disclosed and claimed concept in a first orientation and with an armature thereof in a first position.
Figure 2:
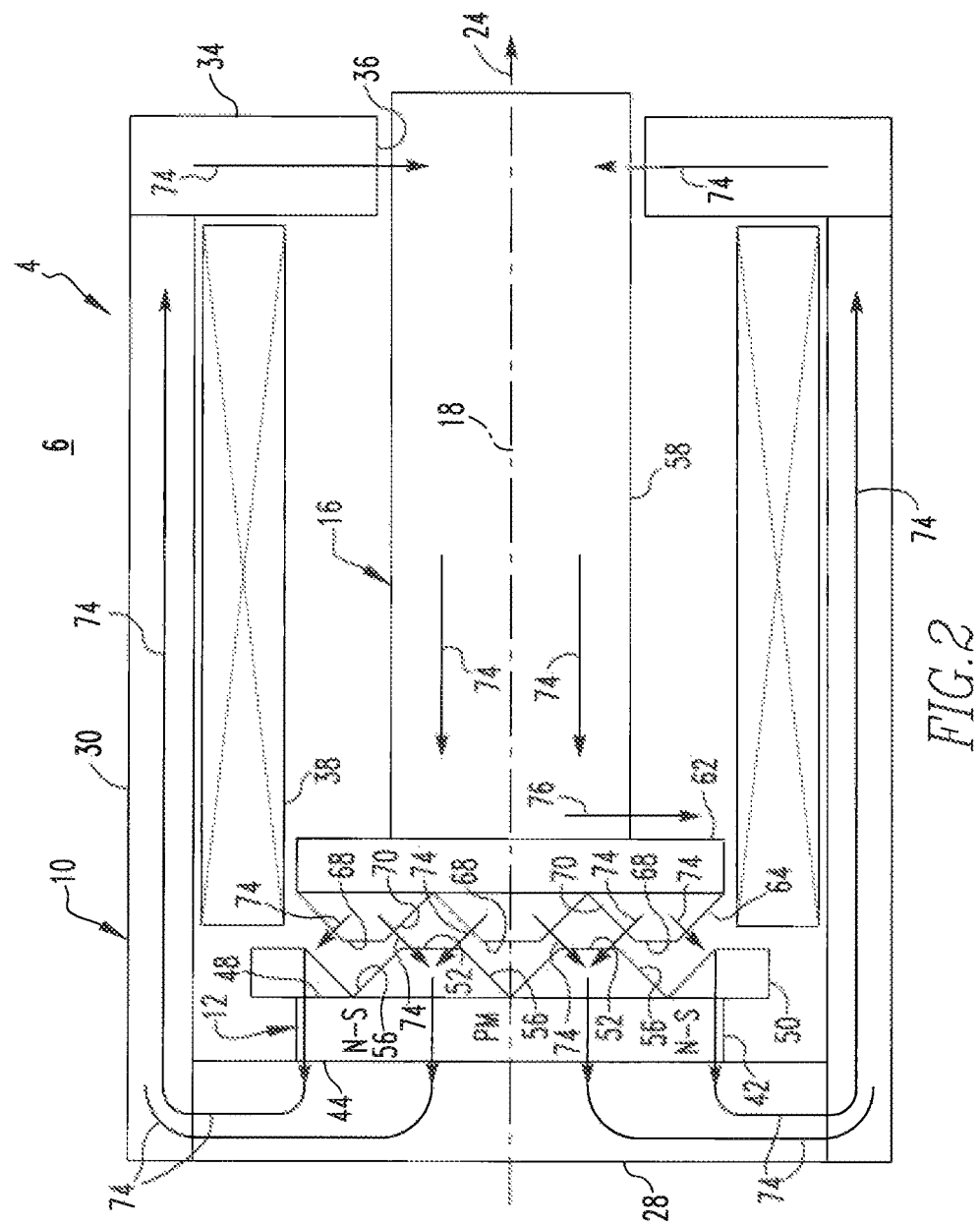
FIG. 2 is a view similar to FIG. 1, except depicting the actuator in a second orientation and depicting the armature in a second position.

An improved actuator 4 in accordance with the disclosed and claimed concept is depicted schematically in FIGS. 1 and 2 and is depicted in part in FIG. 1A. The actuator 4 is a magnetic linear actuator that is mounted to a device 6 in order to perform some operation on the device 6. For example, the device 6 may be a circuit interruption device, and the actuator 4 may be installed therein and operable to switch the circuit interruption device between an ON condition and an OFF condition, by way of example. The exemplary actuator 4 can be said to include a support 10 that is mounted to the device 6 and to further include a first element 12 that is situated on the support 10. The actuator 4 further includes an armature 16 that is movably situated on the support 10 and is movable along a movement axis 18 between a first position engaged with the first element 12, such as is depicted generally in FIG. 1, and a second position spaced along the movement axis 18 away from the first element 12, such as is depicted generally in FIG. 2. The actuator 4 further includes a biasing element 22 that is mounted to the armature 16 and which biases the armature 16 in a direction generally away from the first position and toward the second position. The biasing element 22 thus biases the armature 16 in a biasing direction 24, which is a direction along the movement axis 18 away from the first element 12. While the biasing element 22 is expressly depicted herein in FIG. 1, it is noted that other embodiments of actuators that are set forth herein below likewise include a similar biasing element, although for the sake of simplicity such other biasing elements are not expressly depicted herein. Rather, the biasing direction in which the biasing element biases the corresponding armature is depicted in the other drawings presented herein.

The support 10 can be said to include a first wall 28, a number of lateral walls 30 connected with the first wall 28, and a second wall 34 connected with a number of lateral walls 30. As employed herein, the expression "a number of" and variations thereof shall refer broadly to any non-zero quantity, including a quantity of one. The second wall 34 has an opening 36 formed therein, and the armature 16 is movably situated on the support 10 and is movable through the opening 36. The support 10 is formed of a ferromagnetic material such as iron or steel, by way of example.

The actuator 4 further includes a coil 38 that is situated within an interior region 39 of the support 10 and is situated adjacent the number of lateral walls 30. As is generally understood in the relevant art, the coil 38 is energized with a first polarity in order to cause the armature 16 to move from the second position to the first position. Once in the first position, such as is depicted generally in FIG. 1, a first magnetic attraction between the first element 12 and the armature 16 that will be described in greater detail below is sufficiently strong that it overcomes the bias of the biasing element 22, thus retaining the armature 16 in the first position that is depicted generally in FIG. 1. When it is desired to move the armature 16 from the first position of FIG. 1 to the second position of FIG. 2, the coil 38 can be energized with an opposite polarity which at least partially counteracts the first magnetic attraction to result in a second magnetic attraction between the first element 12 and the armature 16 that is weaker than the first magnetic attraction and which is overcome by the biasing element 22 and which results in the armature 16 being moved by the biasing element 22 in a direction away from the first position of FIG. 1 and toward the second position of FIG. 2.

More particularly, the first element 12 includes a permanent magnet 42 that is depicted in FIGS. 1-2 as being of a circular shape and as having a NORTH pole 44 and a SOUTH pole 48 opposite one another. The first element 12 further includes a first plate 50 that is of a circular configuration and which includes a number of elevated portions 52 that are pie-wedge-shaped and which are formed on a face of the plate 50 that is situated opposite the permanent magnet 42. It is noted that the edges of the elevated portions 52, i.e., at the transitions between the elevated portions 52 and the recessed portions 56, can be vertical or angled. The first plate 50 further includes a number of recessed portions 56 that are situated between adjacent elevated portions 52 such that the elevated portions 52 and the recessed portions 56 can be said to alternate with one another about a perimeter of the first plate 50. The first plate 50 is likewise formed of a ferromagnetic material. As can be understood from FIGS. 1 and 2, the permanent magnet 42 is interposed between the first plate 50 and the first wall 28.

The armature 16 can be said to include an elongated body 58 and to further include a base 62 that is situated at an end of the body 58. The body 58 is movable through the opening 36 when the armature 16 moves between the first and second positions. The armature 16 further includes a second plate 64 situated on the base 62 and formed of a ferromagnetic material. It is noted that the second plate 64 and the base 62 can be formed as a single plate. In a fashion to the first plate 50, the second plate 64 includes a number of elevated portions 68 that are of a wedge-shaped configuration and further includes a number of recessed portions 70 that are situated between adjacent elevated portions 68. It is noted that the edges of the elevated portions 68, i.e., at the transitions between the elevated portions 68 and the recessed portions 70, can be vertical or angled.

In the depicted exemplary embodiment, the armature 16, in addition to being translatable along the movement axis 18 between the first position of FIG. 1 and the second position of FIG. 2, is pivotable about the movement axis 18 between a first orientation with respect to the first element 12, as is depicted generally in FIG. 1, and a second orientation with respect to the first element 12, as is depicted generally in FIG. 2. In the first orientation, the elevated portions 52 of the first plate 50 are in a confronting relationship with the elevated portions 68 of the second plate 64. Further in the first orientation, the recessed portions 56 of the first plate 50 are in a confronting relationship with the recessed portions 70 of the second plate 64. In such an orientation, the permanent magnet 42 induces magnetic flux, as indicated by the magnetic flux lines 74, in the first and second plates 50 and 64 and in the support 10 and the body 58 and the base 62. All of the various magnetic flux lines are indicated at the numeral 74. As can be understood from FIG. 1, the confronting relationship of the elevated portions 52 with the elevated portions 68 facilitates the development of strong magnetic flux through the various ferromagnetic portions of the actuator 4 such as are noted above, it being further noted that the armature 16 itself is formed of a ferromagnetic material. Such strong magnetic flux results in a first magnetic attraction between the first element 12 and the armature 16.

As can be understood from FIG. 2, however, the armature 16 has rotated with respect to the first element 12, with such rotation being indicated at the numeral 76. The exemplary rotation between the first and second orientations is 45 degrees. In the second orientation of FIG. 2, it can be seen that the recessed portions 56 of the first plate 50 are in a confronting relationship with the elevated portions 68 of the second plate 64, and the elevated portions 52 of the first plate 50 are in a confronting relationship with the recessed portions 70 of the second plate 64. Such an arrangement of the first and second plates 50 and 64 with respect to one another causes the magnetic flux lines 74 between the first and second plates 50 and 64 to move in an oblique direction with respect to, for instance, the magnetic flux lines 74 that are in the body 58 and the number of lateral walls 30, thus decreasing the overall magnetic flux through the body 58 and resulting in a second, reduced magnetic attraction between the armature 16 and the first element 12. Such reduced magnetic attraction between the first element 12 and the armature 16 is insufficient to overcome the bias of the biasing element 22, with the result that the positioning of the armature 16 in the second orientation of FIG. 2 results in the biasing element 22 biasing and moving the armature 16 in the biasing direction 24 in a direction generally away from the first element 12 and toward the second position of FIG. 2. While the actuator 4 in the first orientation of FIG. 1 had a first magnetic attraction between the first element 12 and the armature 16 that was sufficient to overcome the bias of the biasing element 22, the actuator 4 in the second orientation of FIG. 2 has a second magnetic attraction between the first element 12 and the armature 16 that is weaker than the first magnetic attraction and that is insufficient to overcome the bias of the biasing element 22. As such, the biasing element 22 moves the armature 16 to the second position of FIG. 2.

While the exemplary actuator 4 is depicted herein as moving between the first and second orientations as a result of rotating the armature 16 about the movement axis 18 with respect to the first element 12, it is understood that the actuator 4 in other embodiments could move between the first and second orientations by instead rotating the first plate 50 of the first element 12 about the movement axis 18 with respect to the armature 16. The amount of rotation about the movement axis 18 that results in movement between the first and second orientations depends upon the configurations of the first and second plates 50 and 64. For instance, if the first and second plates 50 and 64 each include four of the elevated portions 52 and 68 and four instances of the recessed portions 56 and 70, with each of the elevated and recessed portions 52, 56, 68, and 70 occupying a 45° sector of the first and second plates 50 and 64, the rotation about the movement axis that will result in a change between the first orientation and the second orientation will likewise be 45°. It is understood that the bias of the biasing element 22 might overcome the reduced magnetic flux before the armature 16 is fully rotated the 45°. Likewise, if a greater number of elevated and recessed portions 52, 56, 68, and 70 are formed on the first and second plates 58 and 64, a correspondingly reduced rotation in the rotation direction 76 will result in movement of the actuator 4 between the first and second orientations, and vice versa. As can be understood from FIGS. 1 and 2, the first and second plates 50 and 64 have the same number of elevated and recessed portions 52, 56, 68, and 70, and they are of the same relative size and shape.

Figure 10:
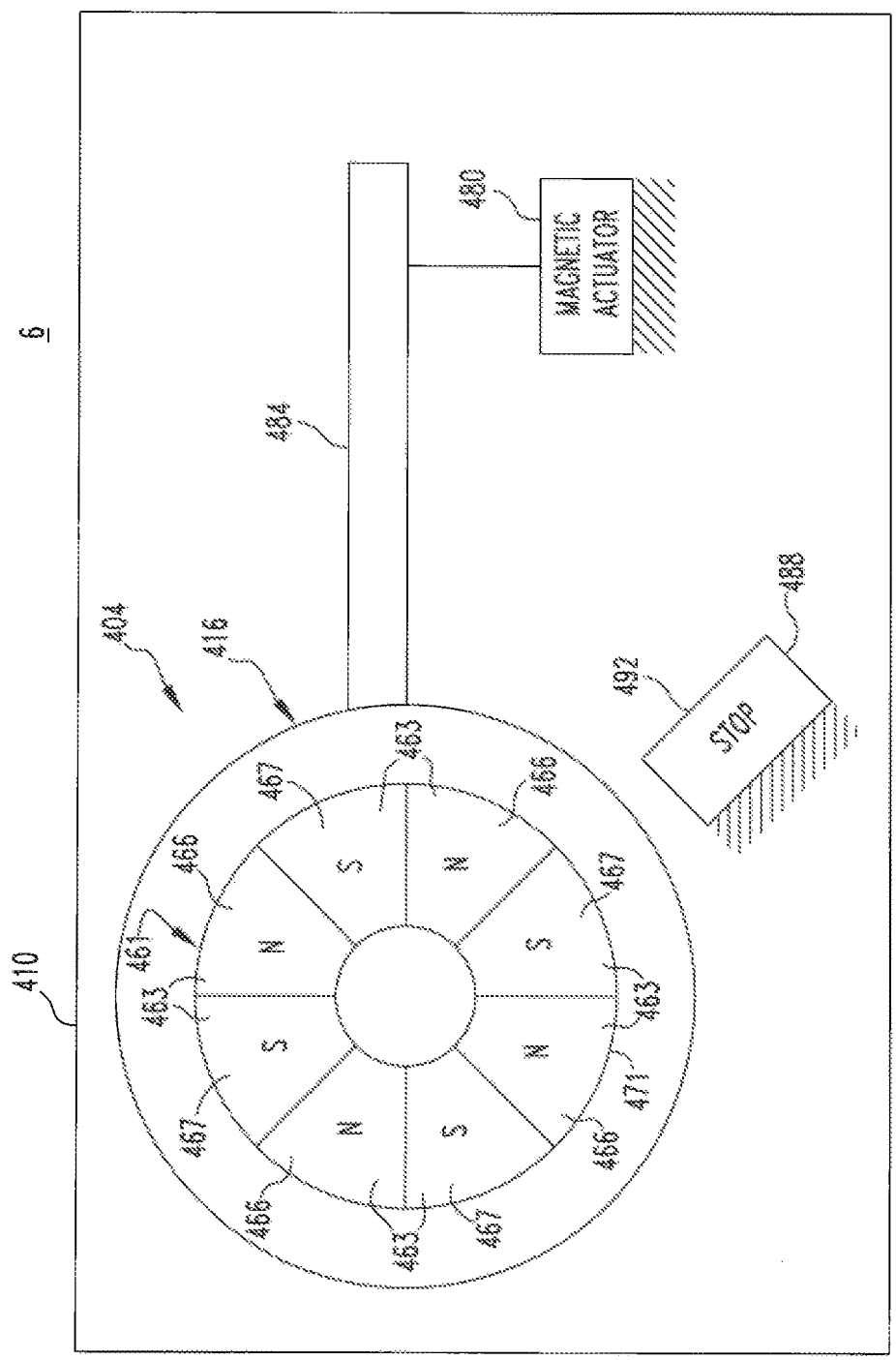
FIG. 10 is another schematic depiction of the actuator of FIG. 8 in the first orientation and depicting a lever arm and a magnetic actuator that can be employed to perform the rotation from the first orientation to the second orientation.

Any structures can be employed to perform the rotation between the first and second orientations. For instance, FIG. 10 depicts a magnetic actuator 480 that is connected via a lever arm 484 to the rotatable portion of another actuator in accordance with another embodiment that will be described in greater detail below, and it is understood that such an arrangement is usable in conjunction with any of the embodiments of the actuators that are set forth herein, including the actuator 4.

In order to return the rotatable structure from the second orientation back to the first orientation, a return spring may be provided, if necessary. It is also understood, however, that when returning the armature 16, for instance, from the second position of FIG. 2 back to the first position of FIG. 1, the first and second plates 50 and 64 will magnetically naturally self-align to the first orientation such as is depicted generally in FIG. 1. As such, it may not be strictly necessary to provide a return spring or other return device since the magnetic properties of the actuator 4 will return the rotating structures from the second orientation to the first orientation when the armature 16 is moved from the second position back to the first position.

It thus can be seen that by rotating a rotatable structure from the first orientation of FIG. 1 to the second orientation of FIG. 2, a relatively small amount of force at a distance, i.e., a torque, is required to release the armature 16 from the first position of FIG. 1 to the second position of FIG. 2. That is, the relatively small amount of torque that moves the armature 16 between the first and second orientations results in a reduction in the magnetic attraction between the first element 12 and the armature 16 sufficient that the biasing element 22 overcomes the reduced magnetic attraction and moves the armature 16 to the second position of FIG. 2. While the coil 38 need not be employed in order to move the armature 16 from the first position of FIG. 1 to the second position of FIG. 2, the coil 38 is nevertheless provided in order to move the armature 16 from the second position back to the first position of FIG. 1. Such rotation of the armature 16 can be performed by the magnetic actuator 480, such as is depicted generally in FIG. 10 in conjunction with a different embodiment of an actuator that will be described herein below in greater detail, or such rotation can be performed manually depending upon the needs of the particular application.

Figure 3:
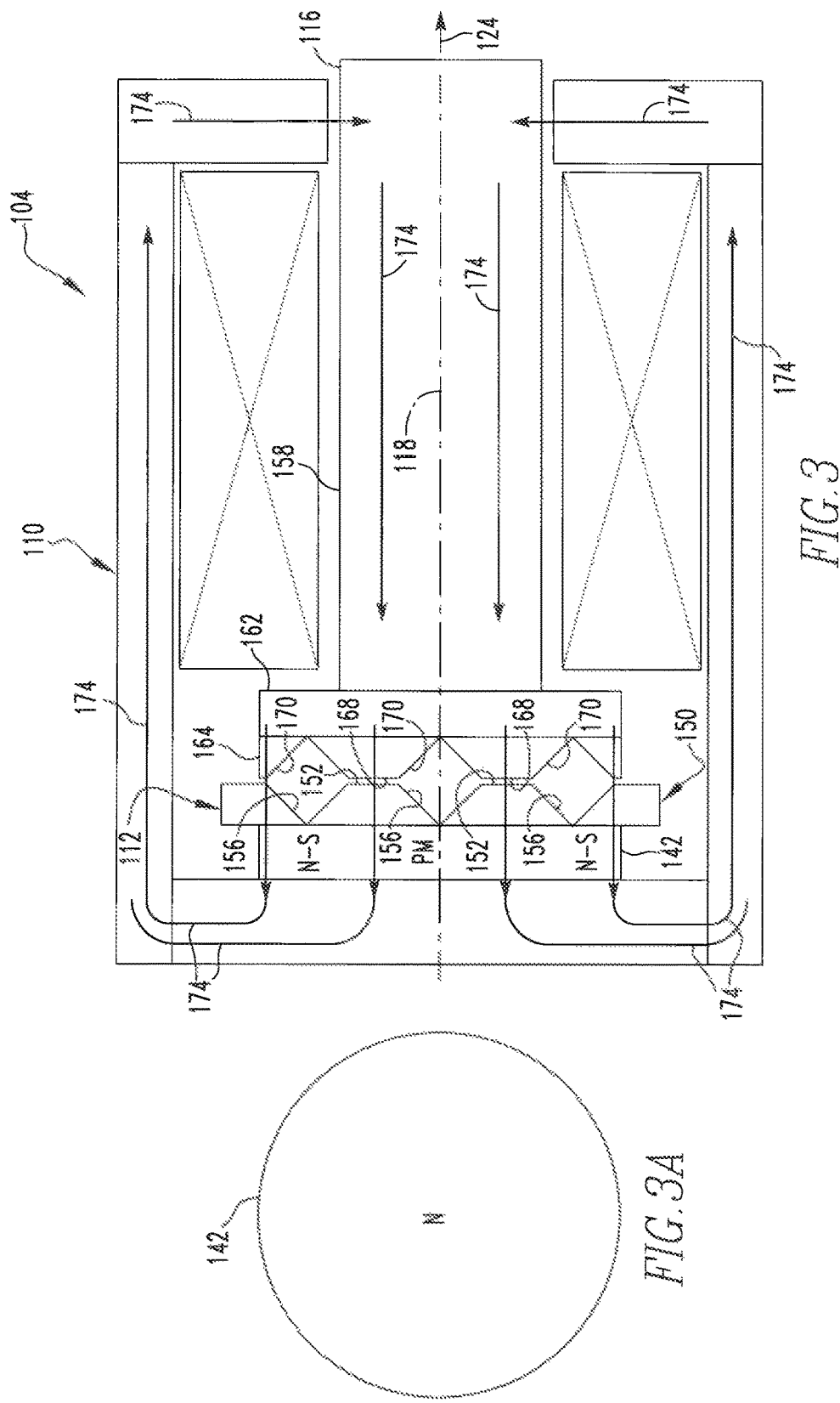
FIG. 3 is a schematic side depiction of an improved actuator in accordance with a second embodiment of the disclosed and claimed concept in a first orientation and with an armature thereof in a first position.
Figure 4:
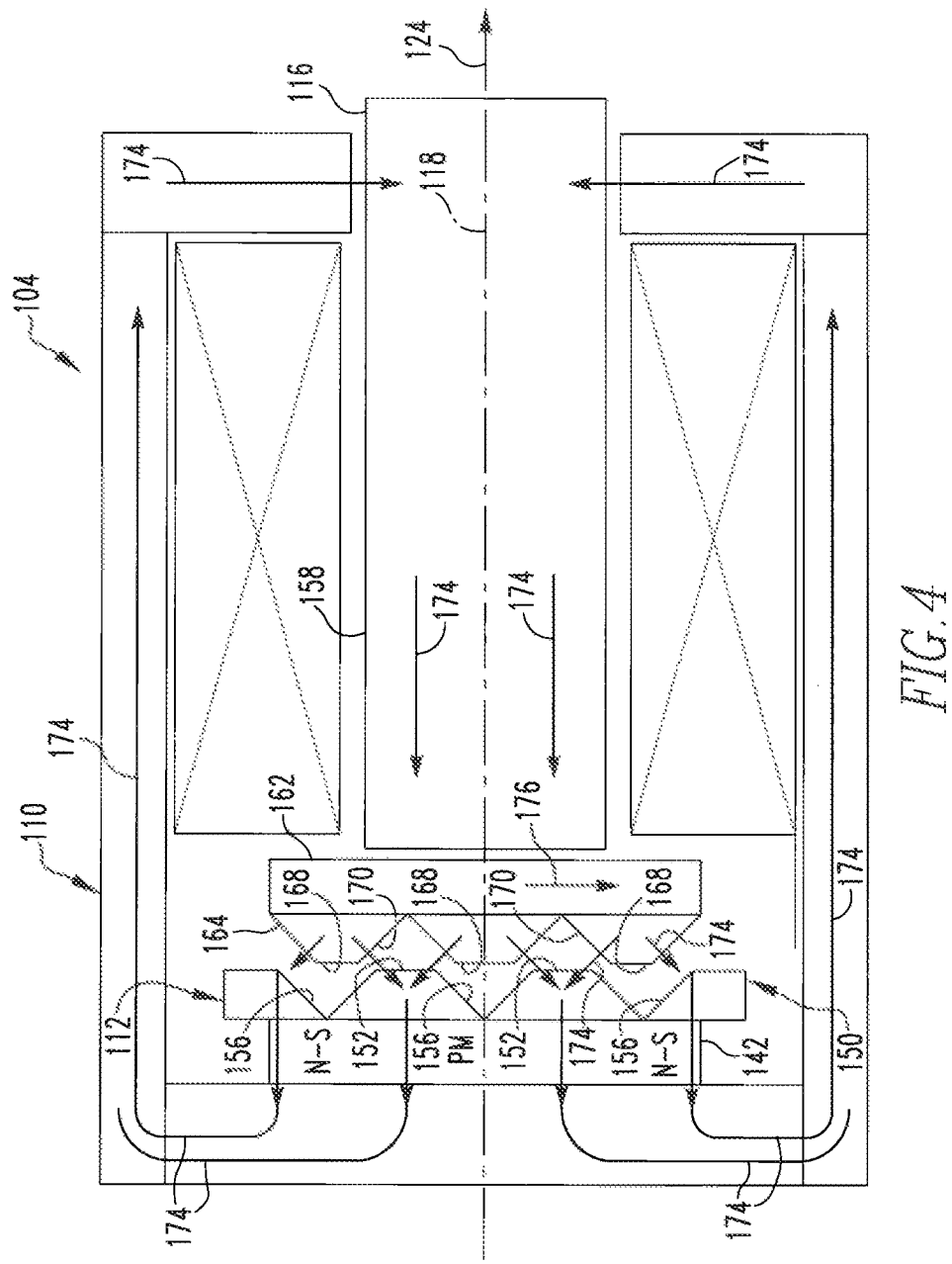
FIG. 4 is a view similar to FIG. 3, except depicting the actuator in a second orientation and with the armature in a second position.

An improved actuator 104 in accordance with a second embodiment of the disclosed and claimed concept is depicted in FIGS. 3-4. The actuator 104 is a magnetic linear actuator that is similar to the actuator 4 inasmuch as the actuator 104 includes a support 110, a first element 112, and an armature 116. The armature 116 is movable along a movement axis 118 between a first position such as is depicted generally in FIG. 3 and a second position such as is depicted generally in FIG. 4. The armature 116 is biased by a biasing element in a biasing direction 124 toward the second position. The first element 112 includes a permanent magnet 142 that is of a circular configuration, such as is depicted generally in FIG. 3A, and further includes a first plate 150 that is of a circular configuration and which includes a number of elevated portions 152 and a number of recessed portions 156. It is noted, however, that the first element 112 further includes a base 162 and a second plate 164 that are separate from a body 158 of the armature 116. The second plate 168 is similar to the first plate 150 and includes a number of elevated portions 168 and a number of recessed portions 170. It thus can be understood that the permanent magnet 142, the first and second plates 150 and 164, and the base 162 function in the actuator 104 in a fashion similar to the way in which the permanent magnet 42, the first and second plates 50 and 64, and the base 62 functioned in the actuator 4. It is understood, however, that the second plate 164 and the base 162 are separate from the armature 116 and are instead a first subassembly portion of the first element 112. As such, the first subassembly portion of the first element 112 is moving between a first orientation and a second orientation, as is indicated at the numeral 176 in FIG. 4, with respect to the first plate 150 of the first element 112. In the depicted exemplary embodiment, the base 162 and the second plate 164, which together constitute the first subassembly portion of the first element 112, are pivoting between the first and second orientations, but it is understood that in other embodiments the first plate 150 instead could be pivoting between the first and second orientations with respect to the base 162 and the second plate 164.

As with the actuator 4, the first element 112 in its second orientation results in the elevated portions 152 confronting the recessed portions 170 and the recessed portions 156 confronting the elevated portions 168. The result is magnetic flux lines (as indicated at the numeral 174) that must travel in an oblique direction with respect to the movement axis 118, and which results in a reduced magnetic flux within the body 158. Such reduced magnetic flux in the body 158 of the armature 116 results in the bias element of the actuator 104 overcoming such reduced magnetic attraction between the first element 112 and the armature 116 which, in turn, results in movement of the armature 116 in the biasing direction 124, as is indicated generally in FIG. 4.

Figure 6:
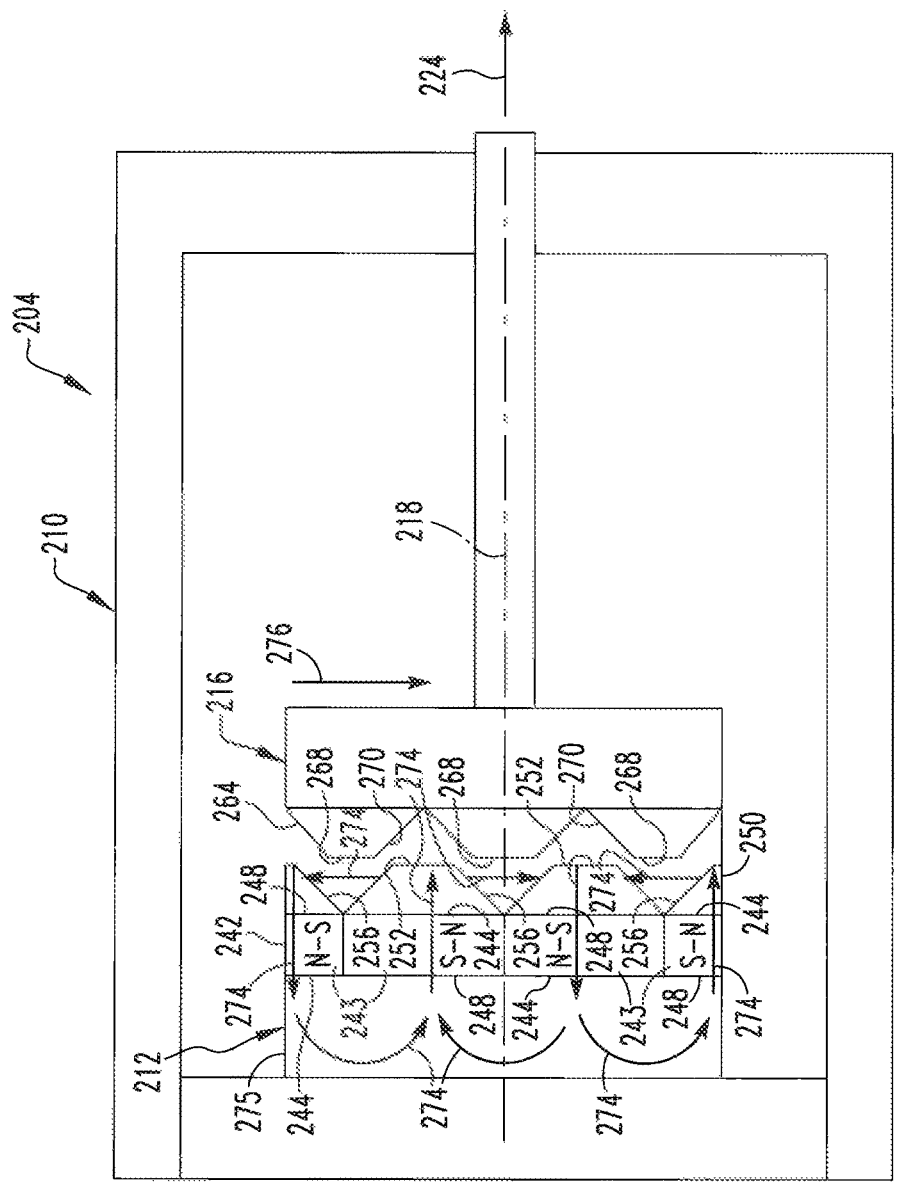
FIG. 6 is a view similar to FIG. 5, except depicting the actuator in a second orientation and with the armature in a second position.

An improved actuator 204 in accordance with a third embodiment of the disclosed and claimed concept is depicted generally in FIGS. 5-6. The actuator 204 includes structures that are similar to those of the actuator 4 inasmuch as the actuator 204 includes a support 210, a first element 212, and an armature 216 that is movable along a movement axis 218 between a first position such as is depicted generally in FIG. 5 and a second position such as is depicted generally in FIG. 6. The actuator 204 additionally includes a biasing element that biases the armature 216 in a biasing direction 224. As with the actuator 4, the first element 212 includes a permanent magnet 242 that is of a circular shape and a first plate 250 having elevated portions 252 and recessed portions 256. The armature 216 includes an elongated body 258 and a base 262, and further includes a second plate 264 situated on the base 262, with the second plate 264 including a number of elevated portions 268 and a number of recessed portions 270. The first and second plates 250 and 264 are of the same configuration as those of the actuators 4 and 104.

It is noted, however, that the permanent magnet 242 is different than those of the actuators 4 and 104 inasmuch as the permanent magnet 242 is formed from a plurality of magnet elements 243 that are distributed along a circular path 246 which, in the depicted exemplary embodiment, could be said to extend along the circular perimeter of the permanent magnet 242. The magnet elements 243 each include a NORTH pole 244 and a SOUTH pole 248 opposite one another, and the magnet elements 243 are arranged with respect to one another such that the poles that face generally toward the armature 216 alternate between NORTH and SOUTH along the path 246, as can be seen in FIG. 5A.

As can be understood from FIG. 5, when the actuator 204 is in the first orientation of FIG. 5 with the alternate positioning of the magnet elements 243 such that their NORTH and SOUTH poles 244 and 248 alternate with one another, the magnetic flux that results in from the permanent magnet 242, as indicated by the magnetic flux lines 274, flows largely through the permanent magnet 242, the first and second plates 250 and 264, the base 262, and a platform 275 that is formed of a ferromagnetic material and that is a structure upon which the permanent magnet 242 is situated. The exemplary permanent magnet 242 is interposed between the platform 275 and first plate 250. Such magnetic flux results in a strong first magnetic attraction between the first element 212 and the armature 216 in the first orientation of FIG. 5.

As can be understood from FIG. 6, however, when the actuator 204 is pivoted from the first orientation of FIG. 5 to the second orientation of FIG. 6, such as through rotation of the armature 216 about the movement axis 218, as indicated at the arrow 276 in FIG. 6, the magnetic flux lines 274 largely cease to flow through the second plate 264 and the base 262. Rather, the magnetic flux instead flows through the permanent magnet 242, the platform 275, and the first plate 250, and furthermore flows parallel with the first plate 250 generally across the recessed portions 256. The reduction in magnetic flux between the first element 212 and the armature 216 as a result of pivoting the armature 216 from the first orientation of FIG. 5 to the second orientation of FIG. 6 results in a second, reduced magnetic attraction between the first element 212 and the armature 216. That is, in the first orientation of FIG. 5, the magnetic flux lines 274 travel through the first element 212 and also through the base 262 and second plate 264 of the armature 216, which results in a first magnetic attraction between the first element 212 and the armature 216 that is relatively strong. However, by causing the elevated portions 252 to confront the recessed portions 270 and causing the recessed portions 256 to confront the elevated portions 268, this results in the magnetic flux lines 274 flowing across the recessed portions 256 rather than flowing into the armature 216. This results in the second, reduced magnetic attraction between the first element 212 and the armature 216, which results in the biasing element of the armature 216 overcoming such second magnetic attraction and moving the armature 216 in the biasing direction 224 to the second position of FIG. 6. This advantageously enables the support 210 and the body 258 to be formed of a non-ferromagnetic material, if this is desired. This could provide savings in weight and expense, along with other savings. It is understood that the first element 212 could instead be pivoted between the first and second orientations with respect to the armature 216 without departing from the spirit of the instant disclosure.

Figure 7:
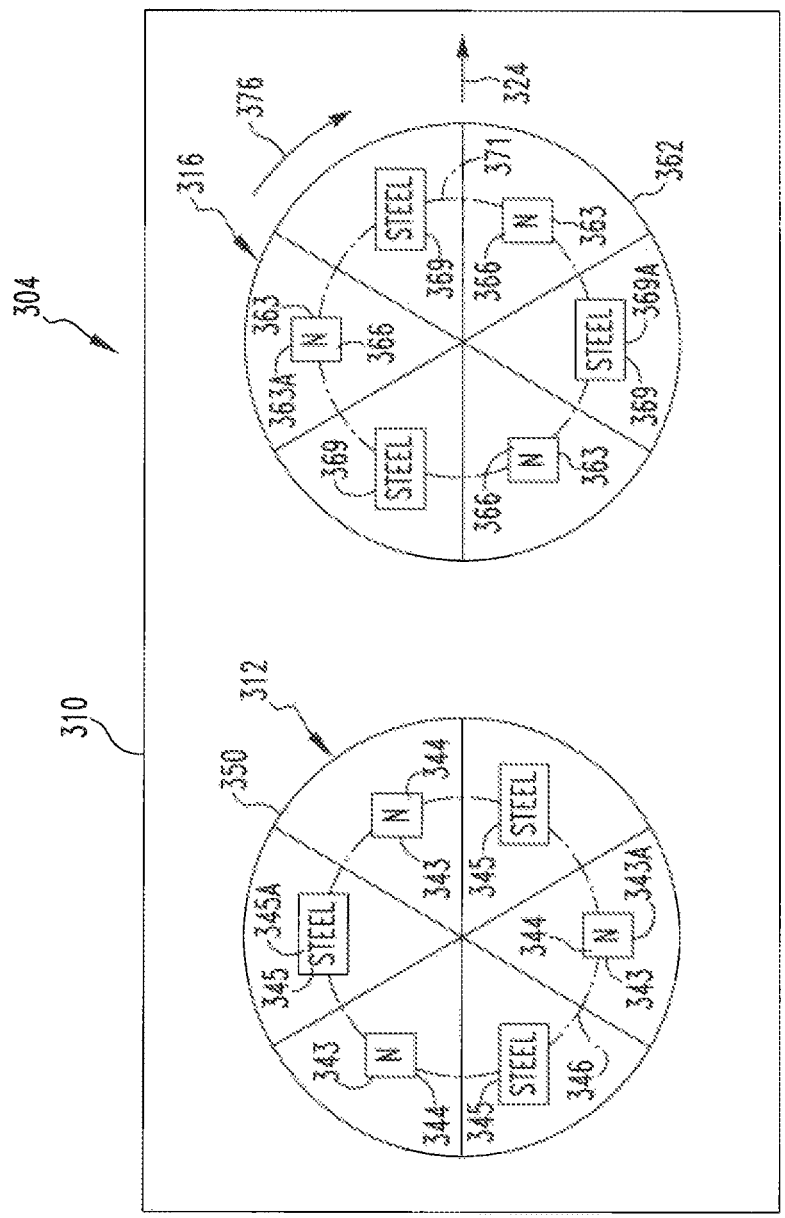
FIG. 7 is a schematic depiction of a magnetic linear actuator in accordance with a fourth embodiment of the disclosed and claimed concept.

An improved actuator 304 in accordance with a fourth embodiment of the disclosed and claimed concept is depicted generally in FIG. 7. The actuator 304 is a magnetic linear actuator having a support 310, a first element 312, and an armature 316. The first element 312 has a first plate 350 that is of a circular configuration and is formed of a ferromagnetic material. The first element 312 further includes a number of first magnet elements 343 and a number of first ferromagnetic elements 345 that are alternately positioned about a circular first path 346 on the first plate 350. In a like fashion, the armature 316 includes a base 362 having a number of second magnet elements 363 and a number of second ferromagnetic elements 369 alternately positioned along a second path 371 thereof that is situated inboard of the perimeter of the base 362. The base 362 is formed of a ferromagnetic material, and other portions of the armature 316 can likewise be formed of a non-ferromagnetic material. Elements 344 may be formed as raised portions on plate 350 as a single part, and elements 363 may be formed as raised portions on base 362 as a single part. It is noted that the first plate 350 and the base 362 may be formed of a non-ferromagnetic material, but this would result in significantly reduced magnetic attraction forces.

As can be understood from FIG. 7, when the armature 316 is situated adjacent the first element 312, a first magnetic element 343A of the first magnet elements 343 will be situated in a confronting relationship with a second ferromagnetic element 369A of the second ferromagnetic elements 369. Likewise, a second magnet element 363A of the second magnet elements 363 will be in a confronting relationship with a first ferromagnetic element 345A of the first ferromagnetic elements 345. Such confronting relationships will result in magnetic attraction between the first magnet element 343A and the second ferromagnetic element 369A and will further result in magnetic attraction between the second magnet element 363A and the first ferromagnetic element 345A. Such magnetic attractions between magnet elements and ferromagnetic elements results in a magnetic attraction between the first element 312 and the armature 316 to retain the armature 316 engaged with the first element 312 in the first orientation that is depicted in FIG. 7.

If the base 362 is rotated from the first orientation of FIG. 7 to a second orientation, such as is indicated with the rotation arrow 376, the first magnet elements 343 and the second magnet elements 363 would be in a confronting relationship. Inasmuch as the poles of the first magnet elements 343 that face toward the armature 316 are all NORTH poles 344, and inasmuch as the poles of the second magnet elements 363 that face toward the first element 312 are likewise NORTH poles 366, the confronting relationship of the NORTH poles 344 and the 366 will result in a mutual magnetic repulsion between the first element 312 and the armature 316. This will result in the biasing element that biases the armature 316 in a biasing direction 324 translating the armature 316 to a second position spaced from the first element 312.

It can be understood that the attraction between a magnet and a ferromagnetic element such as steel is nearly as strong as the magnetic attraction between a magnet and another magnet. By providing the first magnet elements 343 and the second magnet elements 363 to be in a confronting relationship with steel first and second ferromagnetic elements 345 and 369 in the first orientation of the actuator 304, as is depicted in FIG. 7, a strong magnetic attractive force can between the first element 312 and the armature 316 results. However, by providing similar poles, i.e., the NORTH poles 344 and 366, in a confronting relationship in the second orientation of the actuator, as is indicated at the arrow 376, such commonality of the confronting poles of the first and second magnet elements 343 and 363 results in mutual magnetic repulsion between the first portion 312 and the armature 316, thus permitting the biasing element of the actuator 304 to move the armature 316 along a movement axis to a second position spaced from the first element 312. It is also understood that the first portion 312 can instead be pivoted between the first and second orientations with respect to the armature 316 without departing from the spirit of the instant disclosure. In the depicted exemplary embodiment, a rotation of the armature 316 between the first and second orientations is a rotation of sixty degrees, although it is understood that the mutual repulsion may begin and move the armature 316 before full rotation of sixty degrees is reached.

Figure 9:
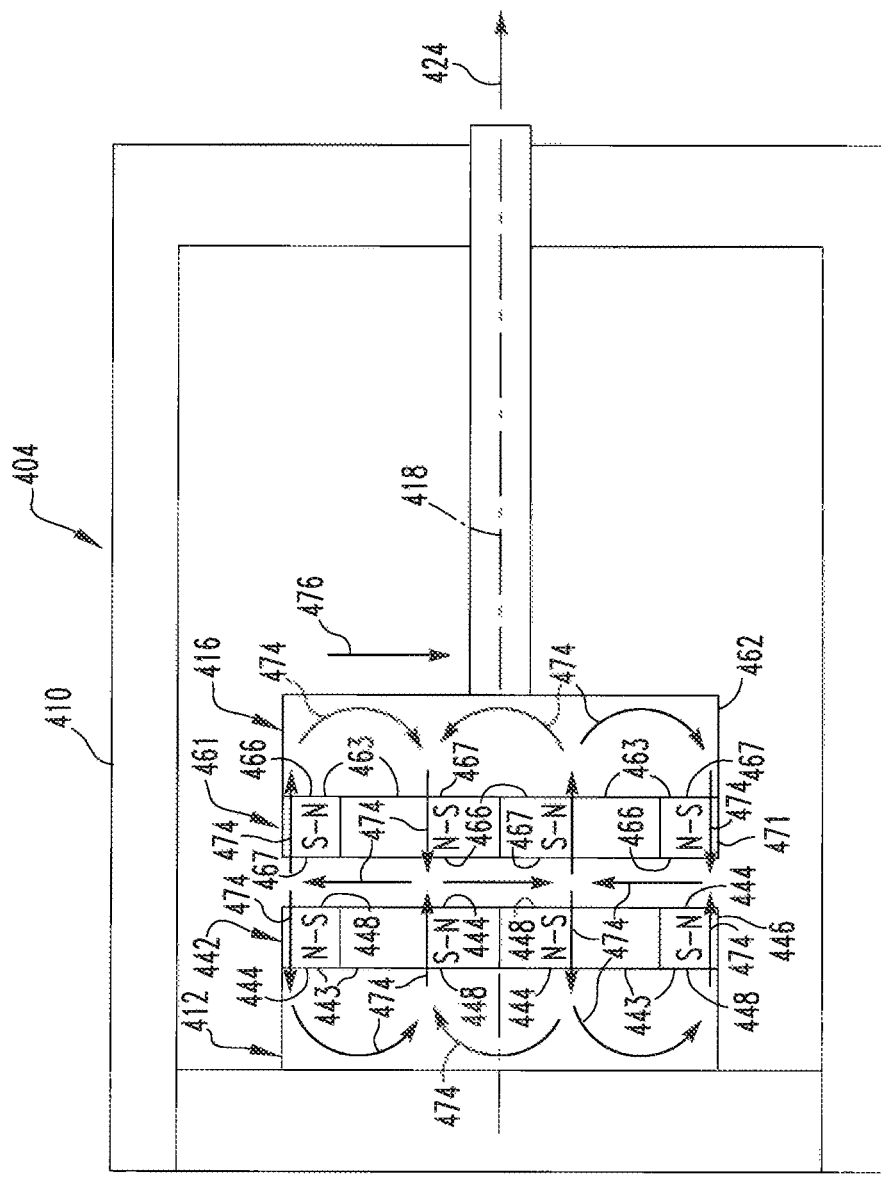
FIG. 9 is a view similar to FIG. 8, except depicting the actuator in a second orientation and with the armature in a second position.

An improved actuator 404 in accordance with a fifth embodiment of the disclosed and claimed concept is depicted in FIGS. 8-10. The actuator 404 is a magnetic linear actuator that includes a support 410, a first element 412 situated on the support 410, and an armature 416 that is movably situated on the support 410. The actuator 404 includes a permanent magnet 442 that is similar to the permanent magnet 242 of the actuator 204. The permanent magnet 442 is situated on a platform 475 that is formed of a ferromagnetic material and that is itself situated on the support 410. However, the armature 416 includes another permanent magnet 461 that is similar to the permanent magnet 242 and that is situated on a base 462 thereof. The base 462 is formed of a ferromagnetic material.

FIG. 8A depicts the permanent magnet 442 as including a plurality of first magnet elements 443 each having a NORTH pole 446 and a SOUTH pole 448, with the first magnet elements 443 being arranged such that the NORTH and SOUTH poles 446 and 448 alternate along a circular path 446 which, in the depicted exemplary embodiment, is the circular perimeter of the circular magnet 442. The other permanent magnet 461, such as is depicted in FIG. 10, is similar thereto inasmuch as it includes a plurality of second magnet elements 463 each having a NORTH pole 466 and a SOUTH pole 467, with the second magnet elements 463 being arranged about the second path 471 such that the NORTH and SOUTH poles 466 and 467 alternate in exactly the fashion of the permanent magnet 442 of FIG. 8A. When the armature 416 is in the first position and the first orientation of FIG. 8, the permanent magnets 442 and 461 are arranged such that the NORTH poles 444 confront the SOUTH poles 467 and the NORTH poles 466 confront the SOUTH poles 448 to thereby together provide a strong first magnetic attraction between the first element 412 and the armature 416. As can be understood from FIG. 8, a number of magnetic flux lines indicated at the numerals 474 extend between the permanent magnets 442 and 461 and additionally pass through the platform 475 and the base 462. The first magnetic attraction is sufficiently strong to overcome the biasing element thereof that biases the armature 416 in a biasing direction 424.

However, when the armature 416 is rotated as is indicated at the arrow 476 in FIG. 9, the first and second magnet elements 443 and 463 are positioned with respect to one another such that the NORTH poles 444 and the NORTH poles 466 confront one another and such that the SOUTH poles 448 and the SOUTH poles 467 likewise confront one another to result in mutual magnetic repulsion between the first element 412 and the armature 416. This causes the armature 416 to move in the biasing direction 424 to the second position of FIG. 9. As can be understood from FIGS. 8-9, the armature 416 is rotated through an angle of approximately 45° about a movement axis 418 along which the armature 416 translates between the first position of FIG. 8 and the second position of FIG. 9. It is understood, however, that the actuator 404 can be configured such that the first element 412 is movable between the first and second orientations rather than the armature 416 being movable between the first and second orientations. It is reiterated that this is the case for the actuators 4, 204, and 304 as well.

As can be understood from FIG. 9, once the armature 416 has been rotated from the first orientation of FIG. 8 to the second orientation of FIG. 9, and the mutual magnetic repulsion between the first element 412 and the armature 416 begins to move the armature 416 away from the first element 412, the magnetic flux between the permanent magnets 442 and 461 diminishes significantly, and rather magnetic flux begins to flow between adjacent first magnet elements 443 of the permanent magnet 442, and likewise magnetic flux begins to flow between adjacent second magnet elements 463 of the permanent magnet 461. This is indicated with additional flux lines 474 in FIG. 9. The reduction in magnetic flux between the permanent magnets 442 and 461 in the second orientation causes the armature 416 to separate rapidly from the first element 412. That is, the armature 416 rapidly moves from its first position in FIG. 8 engaged with the first element 412 in the first orientation to the second position of FIG. 9 spaced away from the first element 412.

As can be seen in FIG. 10, an exemplary magnetic actuator 480 is usable to rotate the armature 416 between the first and second orientations. In the example shown, the magnetic actuator 480 is connected with a lever arm 484 such that a force supplied to the lever arm 484 results in a torque being applied to the armature 416 to rotate it between the first and second orientations. Such a force being applied to the lever arm 484 can instead be applied manually if such an application is desirable depending upon the particular needs of the given application. It is noted that the same lever arm 484 and magnetic actuator 480 can be applied to any of the actuators 4, 104, 204, and 304, depending upon the needs of the given application, to pivot their movable portions between their first and second orientations.

The actuator 404 further includes a stop 488 that is oriented such that an engagement surface 492 is oriented at a 45° angle with respect to a surface of the lever arm 484 when the armature 416 is in the first orientation. It thus can be understood that rotation of the armature 416 until the lever arm 484 engages the engagement surface 492 of the stop 488 will result in the armature 416 being in the second orientation wherein the NORTH poles 444 and 466 confront one another and wherein the SOUTH poles 448 and 467 likewise confront one another to result in the aforementioned mutual magnetic repulsion between the first element 412 and the armature 416. The stop 488 can likewise be implemented into any of the actuators 4, 104, 204, and 304 depending upon the needs of the particular application. While the rotation of the armature 416 between the first and second orientations requires a rotation of the armature 416 through an exemplary angle of 45°, it is noted that if a greater or lesser number of first and second magnet elements 443 and 463 is provided, the angle through which the armature 416 will be moved is correspondingly going to be changed.

Accordingly, it can be seen that the actuators 4, 104, 204, 304, and 404 each provide a disengagement between the first element and the armature thereof upon a relatively simple rotation of at least a portion of the first element or the armature to permit the biasing element thereof to bias the armature to cause the armature to move to the second position spaced away from the first element, such as to move the device 6 between one state and another. The effort required to perform the rotation is relatively small and need not necessarily rely upon a source of electricity. This is highly advantageous since it facilitates the device 6 changing its state. Other advantages will be apparent.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A magnetic linear actuator structured for use in a device, the magnetic linear actuator comprising:
    a support;
    a first element situated on the support;
    an armature that is movable with respect to the support along a movement axis between a first position engaged with the first element and a second position spaced away from the first element along the movement axis;
    a biasing element that biases the armature in a direction generally toward the second position; and
    at least a portion of one of the first element and the armature being pivotable with respect to the other of the first element and the armature between a first orientation and a second orientation, in the first orientation the first element and the armature having a first magnetic attraction to one another sufficient to overcome the bias of the biasing element and retaining the armature in the first position, in the second orientation the first element and the armature having one of a magnetic repulsion from one another and a second magnetic attraction to one another that is weaker than the first magnetic attraction and that is overcome by the bias of the biasing element to cause the biasing element to move the armature toward the second position.

2. The magnetic linear actuator of claim 1 wherein at least one of the first element and the armature comprises a permanent magnet.

3. The magnetic linear actuator of claim 2 wherein the first element comprises a first plate that is formed of a ferromagnetic material and that has a number of elevated portions and a number of recessed portions situated thereon, and wherein one of the first element and the armature comprises a second plate that is formed of a ferromagnetic material and that has another number of elevated portions and another number of recessed portions situated thereon, one of the first plate and the second plate being movable with respect to the other of the first plate and the second plate between the first orientation and the second orientation, in the first orientation the number of elevated portions and the another number of elevated portions confronting one another and the number of recessed portions and the another number of recessed portions confronting one another, in the second orientation the number of elevated portions confronting the another number of recessed portions and the another number of elevated portions confronting the number of recessed portions.

4. The magnetic linear actuator of claim 3 wherein the armature comprises the second plate.

5. The magnetic linear actuator of claim 4 wherein the first plate is situated between the second plate and the permanent magnet in the first position of the armature.

6. The magnetic linear actuator of claim 3 wherein the first element comprises the second plate, one of the first plate and the second plate being rotatable with respect to the other of the first plate and the second plate to move between the first orientation and the second orientation.

7. The magnetic linear actuator of claim 3 wherein the permanent magnet is situated on one of the first element and the armature and comprises a plurality of magnet elements positioned adjacent one another along a path and whose poles that face generally toward the other of the first element and the armature alternate between NORTH and SOUTH along the path.

8. The magnetic linear actuator of claim 7 wherein the second plate is situated on the armature, and wherein the permanent magnet is situated one of:
    on the first element, with the NORTH poles being situated adjacent one of the number of elevated portions and the number of recessed portions and the SOUTH poles being situated adjacent the other of the number of elevated portions and the number of recessed portions, and
    on the armature, with the NORTH poles being situated adjacent one of the another number of elevated portions and the another number of recessed portions and the SOUTH poles being situated adjacent the other of the another number of elevated portions and the another number of recessed portions.

9. The magnetic linear actuator of claim 7 wherein the path is circular in shape.

10. The magnetic linear actuator of claim 3 wherein the support is formed at least in part of a ferromagnetic material and comprises a first wall upon which the first element is situated, a number of lateral walls that extend from the first wall, and a second wall situated on the number of lateral walls opposite the first wall and having an opening formed therein through which the armature is movable between the first and second positions.

11. The magnetic linear actuator of claim 10 wherein the armature is formed of a ferromagnetic material.

12. The magnetic linear actuator of claim 2 wherein the permanent magnet is circular in shape.

13. The magnetic linear actuator of claim 1 wherein the first element comprises a number of permanent magnets and a number of ferromagnetic elements, and wherein the armature comprises another number of permanent magnets and another number of ferromagnetic elements, in the first orientation the number of permanent magnets and the another number of ferromagnetic elements confronting one another and the another number of permanent magnets and the number of ferromagnetic elements confronting one another to provide the first magnetic attraction, in the second orientation the number of permanent magnets confronting the another number of permanent magnets to provide the magnetic repulsion from one another.

14. The magnetic linear actuator of claim 1 wherein the at least portion of the one of the first element and the armature is pivotable about the movement axis between the first orientation and the second orientation.

15. The magnetic linear actuator of claim 1 wherein the first element comprises a permanent magnet that comprises a plurality of magnet elements positioned adjacent one another along a path and whose poles that face generally toward the armature alternate between NORTH and SOUTH along the path, and wherein the armature comprises another permanent magnet that comprises another plurality of magnet elements positioned adjacent one another along another path and whose poles that face generally toward the first element alternate between NORTH and SOUTH along the another path.

16. The magnetic linear actuator of claim 15 wherein in the second orientation the NORTH poles of the plurality of magnet elements confront the NORTH poles of the another plurality of magnet elements and the SOUTH poles of the plurality of magnet elements confront the SOUTH poles of the another plurality of magnet elements to provide the magnetic repulsion from one another.

17. The magnetic linear actuator of claim 16 wherein the first element comprises a plate that is formed of a ferromagnetic material, permanent magnet being situated on the plate, and wherein the armature comprises another plate that is formed of a ferromagnetic material, the another permanent magnet being situated on the another plate, the permanent magnet and the another permanent magnet confronting one another in the first position.

18. The magnetic linear actuator of claim 16 wherein in the first orientation the NORTH poles of the plurality of magnet elements confront the SOUTH poles of the another plurality of magnet elements and the NORTH poles of the another plurality of magnet elements confront the SOUTH poles of the plurality of magnet elements to provide the first magnetic attraction.

19. The magnetic linear actuator of claim 15 wherein the path and the another path are each circular in shape.

20. The magnetic linear actuator of claim 1 wherein one of the first element and the armature comprises a magnetic actuator that is structured to pivot the at least portion of the one of the first element and the armature between the first orientation and the second orientation.

* * * * *